United States Patent
Raghavan

(10) Patent No.: US 7,686,731 B2
(45) Date of Patent: Mar. 30, 2010

(54) WIDE RATIO TRANSMISSION WITH FOUR PLANETARY GEAR SETS AND THREE FIXED INTERCONNECTIONS

(75) Inventor: Madhusudan Raghavan, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 417 days.

(21) Appl. No.: 11/685,800

(22) Filed: Mar. 14, 2007

(65) Prior Publication Data
US 2008/0227586 A1 Sep. 18, 2008

(51) Int. Cl.
*F16H 3/62* (2006.01)

(52) U.S. Cl. .................. 475/276; 475/279; 475/330

(58) Field of Classification Search ............. 475/275, 475/276, 279, 330
See application file for complete search history.

(56) References Cited

U.S. PATENT DOCUMENTS

| | | | |
|---|---|---|---|
| 4,531,428 A * | 7/1985 | Windish | ............. 475/279 |
| 5,061,229 A | 10/1991 | Tsukamoto et al. | |
| 5,088,354 A | 2/1992 | Asada | |
| 5,989,148 A | 11/1999 | Park | |
| 6,375,592 B1 | 4/2002 | Takahashi et al. | |
| 6,425,841 B1 | 7/2002 | Haka | |
| 6,471,615 B1 | 10/2002 | Naraki et al. | |
| 6,558,287 B2 | 5/2003 | Hayabuchi et al. | |
| 7,076,355 B2 | 7/2006 | Ota et al. | |
| 7,163,484 B2 * | 1/2007 | Klemen | ............. 475/276 |
| 7,544,145 B2 * | 6/2009 | Jang | ............. 475/280 |
| 2008/0103015 A1 * | 5/2008 | Seo | ............. 475/280 |

* cited by examiner

*Primary Examiner*—David D Le
(74) *Attorney, Agent, or Firm*—Quinn Law Group, PLLC

(57) ABSTRACT

The transmission has a plurality of members that can be utilized in powertrains to provide at least eight forward speed ratios and one reverse speed ratio. The transmission includes four planetary gear sets having seven torque-transmitting mechanisms and tree fixed interconnections. The powertrain includes an engine and torque converter that is continuously connected to at least one of the planetary gear members and an output member that is continuously connected with another one of the planetary gear members. The seven torque-transmitting mechanisms provide interconnections between various gear members and with the transmission housing, and are operated in combinations of two to establish at least eight forward speed ratios and one reverse speed ratio.

12 Claims, 2 Drawing Sheets

| | Ratios | 80 | 82 | 84 | 85 | 86 | 87 | 88 |
|---|---|---|---|---|---|---|---|---|
| Reverse | -4.20 | | | X | | | X | |
| Neutral | | | | | | | X | |
| 1 | 4.69 | | X | | | | X | |
| 2 | 3.35 | | X | | | | | X |
| 3 | 2.43 | | X | | X | | | |
| 4 | 1.58 | | X | X | | | | |
| 5 | 1.00 | X | X | | | | | |
| 6 | 0.72 | X | | | X | | | |
| 7 | 0.61 | X | | | | X | | |
| 8 | 0.54 | X | | | | X | | |

(X = engaged clutch)

Ring/Sun Tooth Ratio: $\frac{R_1}{S_1} = 1.65$, $\frac{R_2}{S_2} = 2.40$, $\frac{R_3}{S_3} = 1.58$, $\frac{R_4}{S_4} = 1.78$

| Ratio Spread | 8.65 |
|---|---|
| Ratio Steps | |
| Rev/1 | -0.90 |
| 1/2 | 1.40 |
| 2/3 | 1.37 |
| 3/4 | 1.54 |
| 4/5 | 1.58 |
| 5/6 | 1.39 |
| 6/7 | 1.17 |
| 7/8 | 1.13 |

| | Ratios | 180 | 182 | 184 | 185 | 186 | 187 | 188 |
|---|---|---|---|---|---|---|---|---|
| Reverse | -4.20 | | | X | | | X | |
| Neutral | | | | | | | X | |
| 1 | 4.69 | | X | | | | X | |
| 2 | 3.35 | | X | | | | | X |
| 3 | 2.43 | | X | | X | | | |
| 4 | 1.58 | | X | X | | | | |
| 5 | 1.00 | X | X | | | | | |
| 6 | 0.72 | X | | | X | | | |
| 7 | 0.61 | X | | | X | | | |
| 8 | 0.54 | X | | | | X | | |

(X = engaged clutch)

Ring/Sun Tooth Ratio: $\frac{R_1}{S_1} = 1.65$, $\frac{R_2}{S_2} = 2.40$, $\frac{R_3}{S_3} = 1.58$, $\frac{R_4}{S_4} = 2.78$

| Ratio Spread | 8.65 |
|---|---|
| Ratio Steps | |
| Rev/1 | -0.90 |
| 1/2 | 1.40 |
| 2/3 | 1.37 |
| 3/4 | 1.54 |
| 4/5 | 1.58 |
| 5/6 | 1.39 |
| 6/7 | 1.17 |
| 7/8 | 1.13 |

WIDE RATIO TRANSMISSION WITH FOUR PLANETARY GEAR SETS AND THREE FIXED INTERCONNECTIONS

TECHNICAL FIELD

The present invention relates to a family of power transmissions having four planetary gear sets that are controlled by seven torque-transmitting devices to provide at least eight forward speed ratios and one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions.

Seven-, eight- and nine-speed transmissions provide further improvements in acceleration and fuel economy over six-speed transmissions. However, like the six-speed transmissions discussed above, the development of seven-, eight- and nine-speed transmissions has been precluded because of complexity, size and cost.

SUMMARY OF THE INVENTION

It is an object of the present invention to provide an improved family of transmissions having four planetary gear sets controlled to provide at least eight forward speed ratios and one reverse speed ratio.

The electrically variable transmission family of the present invention has four planetary gear sets, each of which includes a first, second and third member, which members may comprise a sun gear, a ring gear, or a planet carrier assembly member, in any order.

In referring to the first, second, third and fourth gear sets in this description and in the claims, these sets may be counted "first" to "fourth" in any order in the drawings (i.e., left to right, right to left, etc.). Additionally, the first, second or third members of each gear set may be counted "first" to "third" in any order in the drawings (i.e., top to bottom, bottom to top, etc.) for each gear set.

Each carrier member can be either a single-pinion carrier member (simple) or a double-pinion carrier member (compound).

A first interconnecting member continuously connects the first member of the first planetary gear set with the first member of the second planetary gear set, the first member of the third planetary gear set and the first member of the fourth planetary gear set.

A second interconnecting member continuously connects the second member of the first planetary gear set with the second member of the second planetary gear set.

A third interconnecting member continuously connects the third member of the second planetary gear set with the second member of the fourth planetary gear set.

The input member is continuously connected with at least one member of the planetary gear sets. The output member is continuously connected with at least one member of the planetary gear sets.

A first torque transmitting device, such a clutch, selectively connects a member of the third planetary gear set with a member of the first, second, third or fourth planetary gear set which is continuously connected with the input member.

A second torque transmitting device, such as a clutch, selectively connects a member of the second planetary gear set with a member of the third planetary gear set.

A third torque transmitting device, such as a brake, selectively connects the second interconnecting member with a stationary member (transmission housing/casing).

A fourth torque transmitting device, such as a brake, selectively connects the first interconnecting member with a stationary member (transmission housing/casing).

A fifth torque transmitting device, such as a brake, selectively connects the third interconnecting member with a stationary member (transmission housing/casing).

A sixth torque transmitting device, such as a brake, selectively connects a member of the third planetary gear set with a stationary member (transmission housing/casing).

A seventh torque transmitting device, such as a brake, selectively connects a member of the fourth planetary gear set with a stationary member (transmission housing/casing).

The seven torque-transmitting mechanisms are selectively engageable in combinations of two to yield at least eight forward speed ratios and at least one reverse speed ratio.

A variety of speed ratios and ratio spreads can be realized by suitably selecting the tooth ratios of the planetary gear sets.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including a planetary transmission in accordance with the present invention;

FIG. 1b is a truth table and chart depicting some of the operating characteristics of the powertrain shown in FIG. 1a;

FIG. 2a is a schematic representation of a powertrain including a planetary transmission incorporating another family member of the present invention; and FIG. 2b is an operating mode table and fixed ratio mode table depicting some of the operating characteristics of the powertrain shown in FIG. 2a.

DESCRIPTION OF THE PREFERRED EMBODIMENTS

Figures 1A, 1B:
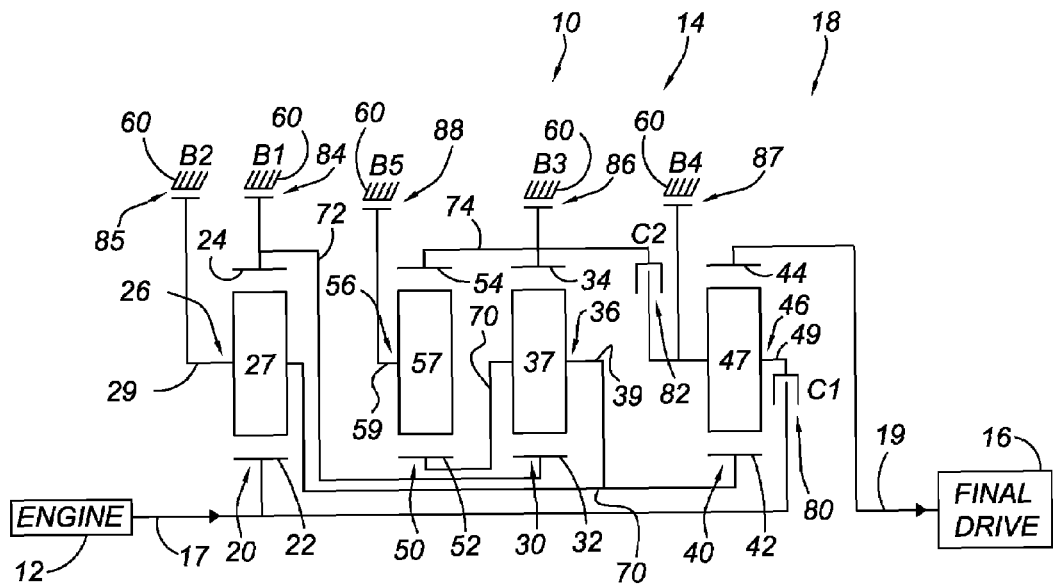

Referring to the drawings, there is shown in FIG. 1a a powertrain 10 having a conventional engine and torque converter 12, a planetary transmission 14, and a conventional final drive mechanism 16. The engine 12 may be powered using various types of fuel to improve the efficiency and fuel economy of a particular application. Such fuels may include, for example, gasoline; diesel; ethanol; dimethyl ether; etc.

The planetary transmission 14 includes an input member 17 continuously connected with the engine 12, a planetary gear arrangement 18, and an output member 19 continuously connected with the final drive mechanism 16. The planetary gear arrangement 18 includes four planetary gear sets 20, 30, 40 and 50.

The planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the ring gear member 34 and the sun gear member 32.

The planetary gear set 40 includes a sun gear member 42, a ring gear member 44, and a planet carrier assembly member 46. The planet carrier assembly member 46 includes a plurality of pinion gears 47 mounted on a carrier member 49 and disposed in meshing relationship with both the ring gear member 44 and the sun gear member 42.

The planetary gear set 50 includes a sun gear member 52, a ring gear member 54, and a planet carrier assembly member 56. The planet carrier assembly member 56 includes a plurality of pinion gears 57 mounted on a carrier member 59 and disposed in meshing relationship with both the ring gear member 54 and the sun gear member 52.

The planetary gear arrangement also includes seven torque-transmitting mechanisms 80, 82, 84, 85, 86, 87 and 88. The torque-transmitting mechanisms 80 and 82 are rotating-type torque-transmitting mechanisms, commonly termed clutches. The torque-transmitting mechanisms 84, 85, 86, 87 and 88 are stationary-type torque-transmitting mechanisms, commonly termed brakes or reaction clutches.

The input member 17 is continuously connected to the sun gear member 22 of the planetary gear set 20. The output member 19 is continuously connected with the ring gear member 44 of the planetary gear set 40. The first interconnecting member 70 continuously connects the carrier member 26 of the planetary gear set 20 with the carrier member 36 of the planetary gear set 30, the sun gear member 42 of the planetary gear set 40 and with the sun gear member 52 of the planetary gear set 50. A second interconnecting member 72 continuously connects the ring gear member 24 of the planetary gear set 20 with the sun gear member 32 of the planetary gear set 30. A third interconnecting member 74 continuously connects the ring gear member 34 of the planetary gear set 30 with the ring gear member 54 of the planetary gear set 50.

A first torque transmitting device, such as clutch 80, selectively connects the carrier member 46 of the planetary gear set 40 with the sun gear member 22 of the planetary gear set 20 which is continuously connected with the input member 17. A second torque transmitting device, such as clutch 82, selectively connects the ring gear member 34 of the planetary gear set 30 and the ring gear member 54 of the planetary gear set 50 via interconnecting member 74 with the carrier member 46 of the planetary gear set 40. A third torque transmitting device, such as brake 84, selectively connects the ring gear member 24 of the planetary gear set 20 and the sun gear member 32 of the planetary gear set 30 via interconnecting member 72 with the transmission housing 60. A fourth torque transmitting device, such as brake 85, selectively connects the carrier member 26 of the planetary gear set 20, the carrier member 36 of the planetary gear set 30, the sun gear member 42 of the planetary gear set 40 and the sun gear member 52 of the planetary gear set 50 via interconnecting member 70 with the transmission housing 60. A fifth torque transmitting device, such as brake 86, selectively connects ring gear member 34 of the planetary gear set 30 and the ring gear member 54 of the planetary gear set 50 via interconnecting member 74 with the transmission housing 60. A sixth torque transmitting device, such as brake 87, selectively connects the carrier member 46 of the planetary gear set 40 with the transmission housing 60. A seventh torque transmitting device, such as brake 88, selectively connects the carrier member 56 of the planetary gear set 50 with the transmission housing 60.

As shown in FIG. 1b, and in particular the truth table disclosed therein, the torque-transmitting mechanisms are selectively engaged in combinations of two to provide at least eight forward speed ratios and one reverse speed ratio.

The reverse (Reverse) speed ratio is established with the engagement of the brakes 84 and 87. The brake 84 engages the ring gear member 24 of the planetary gear set 20 and the sun gear member 32 of the planetary gear set 30 via interconnecting member 72 with the transmission housing 60. The brake 87 engages the carrier member 46 of the planetary gear set 40 with the transmission housing 60. The sun gear member 22 rotates at the same speed as the input member 17. The ring gear member 24 and sun gear member 32 do not rotate. The carrier member 26, carrier member 36, sun gear member 42 and sun gear member 52 rotate at the same speed. The speed of the carrier member 26 is determined from the speed of the sun gear member 22 and the ring gear/sun gear tooth ratio of the planetary gear set 20. The ring gear member 34 and ring gear member 54 rotate at the same speed. The speed of the ring gear member 34 is determined from the speed of the carrier member 36 and the ring gear/sun gear tooth ratio of the planetary gear set 30. The carrier member 46 does not rotate. The ring gear member 44 and output member 19 rotate at the same speed. The speed of the ring gear member 44, and therefore the output member 19, rotates at a speed determined from the speed of the sun gear member 42 and the ring gear/sun gear tooth ratio of the planetary gear set 40. The numerical value of the reverse speed ratio is determined utilizing the ring gear/sun gear tooth ratios of the planetary gear sets 20, 30 and 40.

The first forward speed ratio is established with the engagement of the clutch 82 and brake 87. The clutch 82 engages the ring gear member 34 of the planetary gear set 30 and the ring gear member 54 of the planetary gear set 50 via interconnecting member 74 with the carrier member 46 of the planetary gear set 40. The brake 87 engages the carrier member 46 of the planetary gear set 40 with the transmission housing 60. The sun gear member 22 rotates at the same speed as the input member 17. The carrier member 26, carrier member 36, sun gear member 42 and sun gear member 52 rotate at the same speed. The ring gear member 24 and sun gear member 32 rotate at the same speed. The speed of the carrier member 26 is determined from the speed of the sun gear member 22, the speed of the ring gear member 24 and the ring gear/sun gear tooth ratio of the planetary gear set 20. The ring gear member 34, carrier member 46 and ring gear member 54 do not rotate. The speed of the carrier member 36 is determined from the speed of the sun gear member 32 and the ring gear/sun gear tooth ratio of the planetary gear set 30. The ring gear member 44 and output member 19 rotate at the same speed. The speed of the ring gear member 44, and therefore the output member 19, is determined from the speed of the sun gear member 42 and the ring gear/sun gear tooth ratio of the planetary gear set 40. The numerical value of the first forward speed ratio is determined utilizing the ring gear/sun gear tooth ratios of the planetary gear sets 20, 30 and 40.

The second forward speed ratio is established with the engagement of the clutch 82 and the brake 88. The clutch 82 engages the ring gear member 34 and ring gear member 54 via interconnecting member 74 with the carrier member 46. The brake 88 engages the carrier member 56 with the transmission housing 60. The sun gear member 22 rotates at the same speed as the input member 17. The carrier member 26, carrier member 36, sun gear member 42 and sun gear member 52 rotate at the same speed. The ring gear member 24 and sun gear member 32 rotate at the same speed. The speed of the carrier member 26 is determined from the speed of the sun gear member 22, the speed of the ring gear member 24 and the ring gear/sun gear tooth ratio of the planetary gear set 20. The ring gear member 34, carrier member 46 and ring gear member 54 rotate at the same speed. The speed of the ring gear member 34 is determined from the speed of the sun gear member 32, the speed of the carrier member 36 and the ring gear/sun gear tooth ratio of the planetary gear set 30. The carrier member 56 does not rotate. The speed of the ring gear member 54 is determined from the speed of the sun gear member 52 and the ring gear/sun gear tooth ratio of the planetary gear set 50. The ring gear member 44 and output member 19 rotate at the same speed. The speed of the ring gear member 44, and therefore the output member 19, is determined from the speed of the carrier member 46, the speed of the sun gear member 42 and the ring gear/sun gear tooth ratio of the planetary gear set 40. The numerical value of the second forward speed ratio is determined utilizing the ring gear/sun gear tooth ratios of the planetary gear sets 20, 30, 40 and 50.

The third forward speed ratio is established with the engagement of the clutch 82 and brake 85. The clutch 82 engages the ring gear member 34 and ring gear member 54 via interconnecting member 74 with the carrier member 46. The brake 85 engages the carrier member 26, carrier member 36, sun gear member 42 and sun gear member 52 via interconnecting member 70 with the transmission housing 60. The sun gear member 22 rotates at the same speed as the input member 17. The carrier member 26, carrier member 36, sun gear member 42 and sun gear member 52 do not rotate. The ring gear member 24 and sun gear member 32 rotate at the same speed. The speed of the ring gear member 24 is determined from the speed of the sun gear member 22 and the ring gear/sun gear tooth ratio of the planetary gear set 20. The ring gear member 34, carrier member 46 and ring gear member 54 rotate at the same speed. The speed of the ring gear member 34 is determined from the speed of the sun gear member 32 and the ring gear/sun gear tooth ratio of the planetary gear set 30. The ring gear member 44 and output member 19 rotate at the same speed. The speed of the ring gear member 44, and therefore the output member 19, is determined from the speed of the carrier member 46 and the ring gear/sun gear tooth ratio of the planetary gear set 40. The numerical value of the third forward speed ratio is determined utilizing the ring gear/sun gear tooth ratios of the planetary gear sets 20, 30 and 40.

The fourth forward speed ratio is established with the engagement of the clutch 82 and brake 84. The clutch 82 engages the ring gear member 34 and ring gear member 54 via interconnecting member 74 with the carrier member 46. The brake 84 engages the ring gear member 24 and sun gear member 32 via interconnecting member 72 with the transmission housing 60. The sun gear member 22 rotates at the same speed as the input member 17. The ring gear member 24 and sun gear member 32 do not rotate. The carrier member 26, carrier member 36, sun gear member 42 and sun gear member 52 rotate at the same speed. The speed of the carrier member 26 is determined from the speed of the sun gear member 22 and the ring gear/sun gear tooth ratio of the planetary gear set 20. The ring gear member 34, carrier member 46 and ring gear member 54 rotate at the same speed. The speed of the ring gear member 34 is determined from the speed of the carrier member 36 and the ring gear/sun gear tooth ratio of the planetary gear set 30. The ring gear member 44 and output member 19 rotate at the same speed. The speed of the ring gear member 44, and therefore the output member 19, is determined from the speed of the carrier member 46, the speed of the sun gear member 42 and the ring gear/sun gear tooth ratio of the planetary gear set 40. The numerical value of the fourth forward speed ratio is determined utilizing the ring gear/sun gear tooth ratio of the planetary gear sets 20, 30 and 40.

The fifth forward speed ratio is established with the engagement of the clutches 80 and 82. In this configuration, the input member 17 is directly connected with the output member 19. The numerical value of the ninth forward speed ratio is 1.

The sixth forward speed ratio is established with the engagement of the clutch 80 and brake 84. The clutch 80 engages the carrier member 46 with the sun gear member 22 which is continuously connected with the input member 17. The brake 84 engages the ring gear member 24 and sun gear member 32 via interconnecting member 72 with the transmission housing 60. The sun gear member 22 and carrier member 46 rotate at the same speed as the input member 17. The ring gear member 24 and sun gear member 32 do not rotate. The carrier member 26, carrier member 36, sun gear member 42 and sun gear member 52 rotate at the same speed. The speed of the carrier member 26 is determined from the speed of the sun gear member 22 and the ring gear/sun gear tooth ratio of the planetary gear set 20. The ring gear member 34 and ring gear member 54 rotate at the same speed. The speed of the ring gear member 34 is determined from the speed of the carrier member 36 and the ring gear/sun gear tooth ratio of the planetary gear set 30. The ring gear member 44 and output member 19 rotate at the same speed. The speed of the ring gear member 44, and therefore the output member 19, is determined from the speed of the sun gear member 42, the speed of the carrier member 46 and the ring gear/sun gear tooth ratio of the planetary gear set 40. The numerical value of the sixth forward speed ratio is determined utilizing the ring gear/sun gear tooth ratios of the planetary gear sets 20, 30 and 40.

The seventh forward speed ratio is established with the engagement of the clutch 80 and brake 85. The clutch 80 engages the carrier member 46 with the sun gear member 22 which is continuously connected with the input member 17. The brake 85 engages the carrier member 26, carrier member 36, sun gear member 42 and sun gear member 52 via interconnecting member 70 with the transmission housing 60. The sun gear member 22 and carrier member 46 rotate at the same speed as the input member 17. The carrier member 26, carrier member 36, sun gear member 42 and sun gear member 52 do not rotate. The ring gear member 24 and sun gear member 32 rotate at the same speed. The speed of the ring gear member 24 is determined from the speed of the sun gear member 22 and the ring gear/sun gear tooth ratio of the planetary gear set 20. The ring gear member 34 and ring gear member 54 rotate at the same speed. The speed of the ring gear member 34 is determined from the speed of the sun gear member 32 and the ring gear/sun gear tooth ratio of the planetary gear set 30. The ring gear member 44 and output member 19 rotate at the same speed. The speed of the ring gear member 44, and therefore the output member 19, is determined from the speed of the carrier member 46 and the ring gear/sun gear tooth ratio of the planetary gear set 40. The numerical value of the seventh forward speed ratio is determined utilizing the ring gear/sun gear tooth ratios of the planetary gear sets 20, 30 and 40.

The eighth forward speed ratio is established with the engagement of the clutch 80 and the brake 86. The clutch 80 engages the carrier member 46 with the sun gear member 22 which is continuously connected with the input member 17. The brake 86 engages the ring gear member 34 and ring gear member 54 via interconnecting member 74 with the transmission housing 60. The sun gear member 22 and carrier member 46 rotate at the same speed as the input member 17. The ring gear member 24 and sun gear member 32 rotate at the same speed. The carrier member 26, carrier member 36, sun gear member 42 and sun gear member 52 rotate at the same speed. The speed of the carrier member 26 is determined from the speed of the sun gear member 22, the speed of the ring gear member 24 and the ring gear/sun gear tooth ratio of the planetary gear set 20. The ring gear member 34 and ring gear member 54 do not rotate. The speed of the sun gear member 32 is determined from the speed of the carrier member 36 and the ring gear/sun gear tooth ratio of the planetary gear set 30. The ring gear member 44 and output member 19 rotate at the same speed. The speed of the ring gear member 44, and therefore the output member 19, is determined from the speed of the sun gear member 42, the speed of the carrier member 46 and the ring gear/sun gear tooth ratio of the planetary gear set 40. The numerical value of the eighth forward speed ratio is determined utilizing the ring gear/sun gear tooth ratio of the planetary gear sets 20, 30 and 40.

As set forth above, the engagement schedule for the torque-transmitting mechanisms is shown in the truth table of FIG. 1b. This truth table also provides an example of speed ratios that are available utilizing the ring gear/sun gear tooth ratios given by way of example in FIG. 1b. The $N_{R1}/S_{R1}$ value is the tooth ratio of the planetary gear set 20; the $N_{R2}/S_{R2}$ value is the tooth ratio of the planetary gear set 30; the $N_{R3}/S_{R3}$ value is the tooth ratio of the planetary gear set 40; and the $N_{R4}/S_{R4}$ value is the tooth ratio of the planetary gear set 50. Also, the chart of FIG. 1b describes the ratio steps that are attained utilizing the sample of tooth ratios given, for the engagement schedules of the above described transmission. For example, the step ratio between the first and second forward speed ratios is 1.40, while the step ratio between the reverse speed ratio (Reverse) and first forward ratio is −0.90.

The powertrain 10 may share components with a hybrid vehicle, and such a combination may be operable in a "charge-depleting mode". For purposes of the present invention, a "charge-depleting mode" is a mode wherein the vehicle is powered primarily by an electric motor/generator such that a battery is depleted or nearly depleted when the vehicle reaches its destination. In other words, during the charge-depleting mode, the engine 12 is only operated to the extent necessary to ensure that the battery is not depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle can conserve some or all of the fuel that would otherwise be expended to maintain the 25% battery charge level in a conventional hybrid vehicle. It should be appreciated that a hybrid vehicle powertrain is preferably only operated in the charge-depleting mode if the battery can be recharged after the destination is reached by plugging it into an energy source.

DESCRIPTION OF A SECOND EXEMPLARY EMBODIMENT

Figures 2A, 2B:
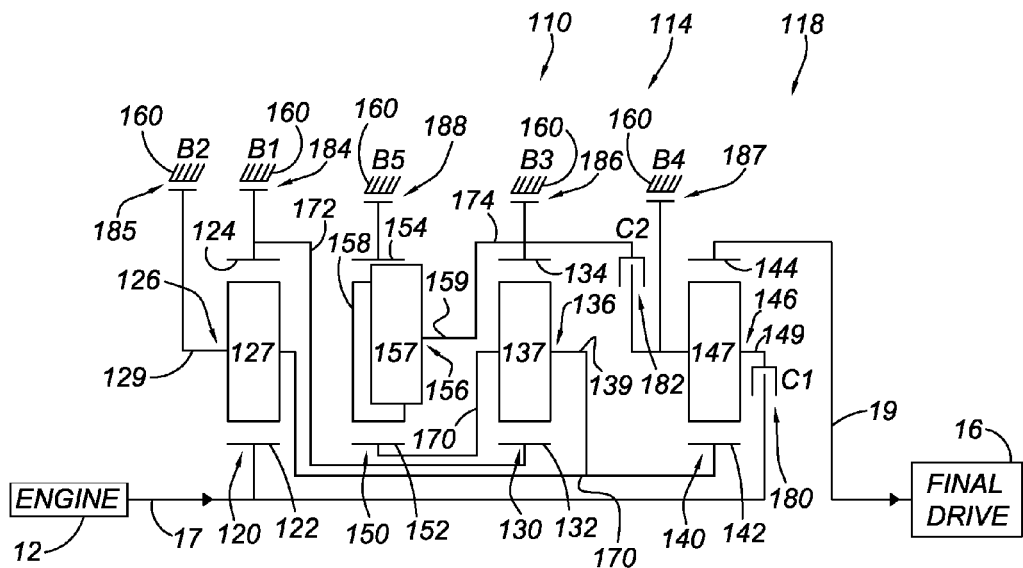

With reference to FIG. 2a, a powertrain 110 is shown, including a conventional engine and torque converter 12 connected to another embodiment of the planetary transmission, designated generally by the numeral 114, and a conventional final drive mechanism 16.

The planetary transmission 114 includes an input member 17 continuously connected with the engine 112, a planetary gear arrangement 118, and an output member 19 continuously connected with the final drive mechanism 16. The planetary gear arrangement 118 includes four planetary gear sets 120, 130, 140 and 150.

The planetary gear set 120 includes a sun gear member 122, a ring gear member 124, and a planet carrier assembly member 126. The planet carrier assembly member 126 includes a plurality of pinion gears 127 rotatably mounted on a carrier member 129 and disposed in meshing relationship with both the sun gear member 122 and the ring gear member 124.

The planetary gear set 130 includes a sun gear member 132, a ring gear member 134, and a planet carrier assembly member 136. The planet carrier assembly member 136 includes a plurality of pinion gears 137 rotatably mounted on a carrier member 139 and disposed in meshing relationship with both the ring gear member 134 and the sun gear member 132.

The planetary gear set 140 includes a sun gear member 142, a ring gear member 144, and a planet carrier assembly member 146. The planet carrier assembly member 146 includes a plurality of pinion gears 147 mounted on a carrier member 149 and disposed in meshing relationship with both the ring gear member 144 and the sun gear member 142.

The planetary gear set 150 includes a sun gear member 152, a ring gear member 154, and a planet carrier assembly member 156. The planet carrier assembly member 156 includes a plurality of pinion gears 157, 158 mounted on a carrier member 159. The pinion gears 157 are disposed in meshing relationship with the ring gear member 154 and the pinion gears 158 are disposed in meshing relationship with the sun gear member 152 and the respective pinion gear 157.

The planetary gear arrangement also includes seven torque-transmitting mechanisms 180, 182, 184, 185, 186, 187 and 188. The torque-transmitting mechanisms 180 and 182 are rotating-type torque-transmitting mechanisms, commonly termed clutches. The torque-transmitting mechanisms 184, 185, 186, 187 and 188 are stationary-type torque-transmitting mechanisms, commonly termed brakes or reaction clutches.

The input member 17 is continuously connected to the sun gear member 122 of the planetary gear set 120. The output member 19 is continuously connected with the ring gear member 144 of the planetary gear set 140. The first interconnecting member 170 continuously connects the carrier member 126 with the carrier member 136, the sun gear member 142 and the sun gear member 152. The second interconnecting member 172 continuously connects the ring gear member 124 with the sun gear member 132. The third interconnecting member 174 continuously connects the ring gear member 134 with the carrier member 156.

A first torque transmitting device, such as clutch 180, selectively connects the carrier member 146 with the sun gear member 122 which is continuously connected with the input member 17. A second torque transmitting device, such as clutch 182, selectively connects the ring gear member 134 and carrier member 156 via interconnecting member 174 with the carrier member 146. A third torque transmitting device, such as brake 184, selectively connects the sun gear member 124 and the sun gear member 132 via interconnecting member 172 with the transmission housing 160. A fourth torque transmitting device, such as brake 185, selectively connects the carrier member 126, the carrier member 136, the sun gear member 142 and the carrier member 152 via interconnecting member 170 with the transmission housing 160. A fifth torque transmitting device, such as brake 186, selectively connects the ring gear member 134 and the carrier member 156 via interconnecting member 174 with the transmission housing 160. A sixth torque transmitting device, such as brake 187, selectively connects the carrier member 146 with the transmission housing 160. A seventh torque transmitting device, such as brake 188, selectively connects the ring gear member 154 with the transmission housing 160.

The truth table given in FIG. 2b shows the engagement sequences for the torque-transmitting mechanisms to provide at least eight forward speed ratios and at least one reverse ratio. As shown and described above for the configuration in FIG. 1a, those skilled in the art will understand from the respective truth tables how the speed ratios are established through the planetary gear sets identified in the written description.

As set forth above, the truth table of FIG. 2b describes the engagement sequence of the torque-transmitting mechanisms utilized to provide one reverse drive ratio and at least seven forward speed ratios. The truth table also provides an example of the ratios that can be attained with the family members shown in FIG. 2a utilizing the sample tooth ratios given in FIG. 2b. The $N_{R1}/N_{S1}$ value is the tooth ratio of the planetary gear set 120; the $N_{R2}/N_{S2}$ value is the tooth ratio of the planetary gear set 130; the $N_{R3}/N_{S3}$ value is the tooth ratio of the planetary gear set 140; and the $N_{R4}/N_{S4}$ value is the tooth ratio of the planetary gear set 150. Also shown in FIG. 2b are the ratio steps between single step ratios in the forward direction as well as the reverse to first ratio step ratio for the engagement schedule. For example, the first to second step ratio is 1.40.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
   an input shaft;
   an output shaft;
   first, second, third and fourth planetary gear sets each having first, second and third members;
   said input shaft being continuously interconnected with at least one member of said planetary gear sets, and said output shaft being continuously interconnected with another member of said planetary gear sets;
   a first interconnecting member continuously connecting said first member of said first planetary gear set with said first member of said second planetary gear set, said first member of said third planetary gear set and said first member of said fourth planetary gear set;
   a second interconnecting member continuously connecting said second member of said first planetary gear set with said second member of said second planetary gear set;
   a third interconnecting member continuously connecting said third member of said second planetary gear set with said second member of said fourth planetary gear set;
   a first torque-transmitting mechanism selectively connecting a member of said third planetary gear set with a member of said first, second, third or fourth planetary gear set which is continuously connected with said input member;
   a second torque-transmitting mechanism selectively connecting a member of said second planetary gear set with a member of said third planetary gear set;
   a third torque-transmitting mechanism selectively connecting said second interconnecting member with a stationary member;
   a fourth torque-transmitting mechanism selectively connecting said first interconnecting member with said stationary member;
   a fifth torque-transmitting mechanism selectively connecting said third interconnecting member with said stationary member;
   a sixth torque-transmitting mechanism selectively connecting a member of said third planetary gear set with said stationary member;
   a seventh torque-transmitting mechanism selectively connecting a member of said fourth planetary gear set with said stationary member;
   said torque-transmitting mechanisms being engaged in combinations of two to establish at least eight forward speed ratios and at least one reverse speed ratio between said input shaft and said output shaft.

2. The transmission defined in claim 1, wherein said first and second torque-transmitting mechanisms comprise clutches, and said third, fourth, fifth, sixth and seventh torque-transmitting mechanisms comprise brakes.

3. The transmission defined in claim 1, wherein at least one planet carrier assembly member of said planetary gear sets is a double-pinion carrier.

4. A multi-speed transmission comprising:
   an input shaft;
   an output shaft;
   a planetary gear arrangement having first, second, third and fourth planetary gear sets, each planetary gear set having first, second and third members;
   said input shaft being continuously interconnected with at least one member of said planetary gear sets, and said output shaft being continuously interconnected with another member of said planetary gear sets;
   a first interconnecting member continuously connecting said first member of said first planetary gear set with said first member of said second planetary gear set, said first member of said third planetary gear set and said first member of said fourth planetary gear set;
   a second interconnecting member continuously connecting said second member of said first planetary gear set with said second member of said second planetary gear set;

a third interconnecting member continuously connecting said third member of said second planetary gear set with said second member of said fourth planetary gear set; and first, second, third, fourth, fifth, sixth and seventh torque-transmitting mechanisms each of which selectively interconnects one of said first interconnecting member, second interconnecting member, and a respective one of said members of said planetary gear sets with one of a stationary member and another respective one of said members of said planetary gear sets, said torque-transmitting mechanisms being engaged in combinations of two to establish at least eight forward speed ratios and at least one reverse speed ratio between said input shaft and said output shaft.

5. The transmission defined in claim 4, wherein at least one planet carrier assembly member of said planetary gear sets is a double-pinion carrier.

6. The transmission defined in claim 4, wherein said first torque-transmitting mechanism is operable for selectively connecting a member of said third planetary gear set with a member of said first, second, third or fourth planetary gear set which is continuously connected with said input member.

7. The transmission defined in claim 6, wherein said second torque-transmitting mechanism is operable for selectively connecting a member of said second planetary gear set with a member of said third planetary gear set.

8. The transmission defined in claim 7, wherein said third torque-transmitting mechanism is operable for selectively connecting said second interconnecting member with said stationary member.

9. The transmission defined in claim 8, wherein said fourth torque-transmitting mechanism is operable for selectively connecting said first interconnecting member with said stationary member.

10. The transmission defined in claim 9, wherein said fifth torque-transmitting mechanism is operable for selectively connecting said third interconnecting member with said stationary member.

11. The transmission defined in claim 10, wherein said sixth torque-transmitting mechanism is operable for selectively connecting a member of said third planetary gear set with said stationary member.

12. The transmission defined in claim 11, wherein said seventh torque-transmitting mechanism is operable for selectively interconnecting a member of said fourth planetary gear set with said stationary member.

* * * * *